United States Patent
Alperin

(10) Patent No.: US 8,204,950 B2
(45) Date of Patent: Jun. 19, 2012

(54) WEBPAGE SEARCH

(75) Inventor: Jordan Alperin, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 706 days.

(21) Appl. No.: 11/228,446

(22) Filed: Sep. 15, 2005

(65) Prior Publication Data

US 2007/0061410 A1   Mar. 15, 2007

(51) Int. Cl.
*G06F 15/16* (2006.01)

(52) U.S. Cl. ........ 709/207; 709/224; 715/206; 715/236; 715/238; 715/205; 715/234

(58) Field of Classification Search ........... 709/206–207
See application file for complete search history.

(56) References Cited

U.S. PATENT DOCUMENTS

| | | |
|---|---|---|
| 4,837,798 A | 6/1989 | Cohen et al. |
| 5,406,557 A | 4/1995 | Baudoin |
| 5,410,691 A | 4/1995 | Taylor |
| 5,479,411 A | 12/1995 | Klein |
| 5,524,137 A | 6/1996 | Rhee |
| 5,633,484 A | 5/1997 | Zancho et al. |
| 5,724,410 A | 3/1998 | Parvulescu et al. |
| 5,742,905 A | 4/1998 | Pepe et al. |
| 5,920,835 A | 7/1999 | Huzenlaub et al. |
| 5,937,162 A | 8/1999 | Funk et al. |
| 5,974,449 A | 10/1999 | Chang et al. |
| 6,014,429 A | 1/2000 | LaPorta et al. |
| 6,081,830 A | 6/2000 | Schindler |
| 6,094,681 A | 7/2000 | Shaffer et al. |
| 6,154,772 A | 11/2000 | Dunn et al. |
| 6,173,259 B1 | 1/2001 | Bijl et al. |
| 6,345,279 B1 | 2/2002 | Li et al. |
| 6,366,651 B1 | 4/2002 | Griffith et al. |
| 6,407,680 B1 | 6/2002 | Lai et al. |
| 6,421,733 B1 | 7/2002 | Tso et al. |
| 6,438,221 B1 | 8/2002 | Lee et al. |
| 6,442,589 B1 | 8/2002 | Takahashi et al. |
| 6,442,606 B1 * | 8/2002 | Subbaroyan et al. ......... 709/224 |
| 6,459,776 B1 | 10/2002 | Aktas et al. |
| 6,463,463 B1 | 10/2002 | Godfrey et al. |
| 6,483,899 B2 | 11/2002 | Agraharam et al. |
| 6,556,217 B1 | 4/2003 | Makipaa et al. |

(Continued)

FOREIGN PATENT DOCUMENTS

WO   WO 97/23082   6/1997

OTHER PUBLICATIONS

The Web Design Resource, "Manipulating Font Size and Color", Jun. 27, 1998, The Web Design Resource, all pages.*

(Continued)

*Primary Examiner* — Hua Fan

(57) ABSTRACT

Systems, methods, and machine-readable media are disclosed to provide a search of contents of a webpage, where the search feature is provided as part of the webpage. In one embodiment, a method of providing such an in-page search of contents of a webpage can comprise reading a user's search criteria through an element of the webpage. The contents of the webpage can be searched to identify text matching the search criteria. Formatting instructions can be inserted into the webpage to change the appearance of the identified text relative to other text on the webpage. The webpage can be redisplayed with the inserted formatting instructions.

30 Claims, 5 Drawing Sheets

U.S. PATENT DOCUMENTS

| | | | |
|---|---|---|---|
| 6,564,264 | B1 | 5/2003 | Creswell et al. |
| 6,694,004 | B1 | 2/2004 | Knoerle |
| 6,754,904 | B1 | 6/2004 | Cooper et al. |
| 6,768,789 | B1 | 7/2004 | Wilk |
| 6,775,658 | B1 | 8/2004 | Zothner |
| 6,782,253 | B1 | 8/2004 | Shteyn et al. |
| 6,799,174 | B2 | 9/2004 | Chipman et al. |
| 6,801,793 | B1 | 10/2004 | Aarnio et al. |
| 6,816,582 | B2 | 11/2004 | Levine |
| 6,826,173 | B1 | 11/2004 | Kung et al. |
| 6,826,407 | B1 | 11/2004 | Helferich |
| 6,832,259 | B2 | 12/2004 | Hymel et al. |
| 6,832,377 | B1 | 12/2004 | Havemose |
| 6,879,838 | B2 | 4/2005 | Rankin et al. |
| 6,882,709 | B1 | 4/2005 | Sherlock et al. |
| 6,938,087 | B1 | 8/2005 | Abu-Samaha |
| 6,964,014 | B1 * | 11/2005 | Parish ............................ 715/205 |
| 6,977,993 | B2 | 12/2005 | Starbuck et al. |
| 6,988,128 | B1 | 1/2006 | Alexander et al. |
| 7,013,331 | B2 | 3/2006 | Das |
| 7,069,301 | B2 | 6/2006 | Jerbi et al. |
| 7,069,309 | B1 | 6/2006 | Dodrill et al. |
| 7,072,056 | B1 | 7/2006 | Greaves et al. |
| 7,076,734 | B2 | 7/2006 | Wolff et al. |
| 7,106,473 | B2 | 9/2006 | Sekiguchi |
| 7,120,870 | B1 * | 10/2006 | Nakamura ..................... 715/236 |
| 7,188,073 | B1 | 3/2007 | Tarn et al. |
| 7,212,543 | B1 | 5/2007 | Arwald et |
| 7,212,614 | B1 | 5/2007 | Burg et al |
| 7,219,163 | B2 | 5/2007 | Robinson et al. |
| 7,224,774 | B1 | 5/2007 | Brown et al. |
| 7,272,662 | B2 | 9/2007 | Chesnais et al. |
| 7,295,752 | B1 | 11/2007 | Jain et al. |
| 7,310,329 | B2 | 12/2007 | Vieri et al. |
| 7,383,308 | B1 | 6/2008 | Groves et al. |
| 7,385,875 | B2 | 6/2008 | May et al. |
| 7,526,572 | B2 | 4/2009 | Omar et al. |
| 7,551,727 | B2 | 6/2009 | Howell et al. |
| 7,587,033 | B2 | 9/2009 | Crago et al. |
| 7,596,369 | B2 | 9/2009 | Alperin et al. |
| 7,688,962 | B1 | 3/2010 | Knoerie et al. |
| 8,078,476 | B2 | 12/2011 | Alperin et al. |
| 2002/0026457 | A1 | 2/2002 | Jensen |
| 2002/0032589 | A1 | 3/2002 | Shah |
| 2002/0075519 | A1 | 6/2002 | Konsella et al. |
| 2002/0076027 | A1 | 6/2002 | Bernnan et al. |
| 2002/0082030 | A1 | 6/2002 | Berndt et al. |
| 2002/0087704 | A1 | 7/2002 | Chesnais et al. |
| 2002/0098831 | A1 | 7/2002 | Castell et al. |
| 2002/0102965 | A1 | 8/2002 | Mandahl et al. |
| 2002/0111991 | A1 | 8/2002 | Wood et al. |
| 2002/0128036 | A1 | 9/2002 | Yach et al. |
| 2002/0144273 | A1 | 10/2002 | Reto |
| 2002/0156871 | A1 | 10/2002 | Munarriz et al. |
| 2002/0169823 | A1 | 11/2002 | Coulombe et al. |
| 2002/0170067 | A1 | 11/2002 | Norstrom et al. |
| 2002/0174194 | A1 | 11/2002 | Mooney et al. |
| 2002/0194150 | A1 * | 12/2002 | Bates et al. ......................... 707/1 |
| 2003/0088633 | A1 | 5/2003 | Chiu et al. |
| 2003/0097262 | A1 | 5/2003 | Nelson |
| 2003/0120717 | A1 | 6/2003 | Callaway et al. |
| 2003/0147369 | A1 | 8/2003 | Singh et al. |
| 2003/0149646 | A1 | 8/2003 | Chen et al. |
| 2003/0172139 | A1 | 9/2003 | Srinivasan et al. |
| 2003/0172175 | A1 | 9/2003 | McCormack et al. |
| 2004/0044663 | A1 | 3/2004 | Horompoly |
| 2004/0054719 | A1 | 3/2004 | Daigle et al. |
| 2004/0058673 | A1 | 3/2004 | Irlam et al. |
| 2004/0075698 | A1 | 4/2004 | Gao et al. |
| 2004/0091089 | A1 | 5/2004 | Wynn |
| 2004/0170155 | A1 | 9/2004 | Omar et al. |
| 2004/0199665 | A1 | 10/2004 | Omar et al. |
| 2004/0268265 | A1 | 12/2004 | Berger |
| 2005/0015311 | A1 | 1/2005 | Frantz et al. |
| 2005/0015443 | A1 | 1/2005 | Levine et al. |
| 2005/0018653 | A1 | 1/2005 | Phillips et al. |
| 2005/0033806 | A1 | 2/2005 | Harvey et al. |
| 2005/0037762 | A1 | 2/2005 | Gurbani et al. |
| 2005/0053206 | A1 | 3/2005 | Chingon et al. |
| 2005/0075097 | A1 | 4/2005 | Lehikoinen et al. |
| 2005/0086282 | A1 | 4/2005 | Anderson et al. |
| 2005/0089149 | A1 | 4/2005 | Elias |
| 2005/0091327 | A1 | 4/2005 | Koch |
| 2005/0101343 | A1 | 5/2005 | Hsiao |
| 2005/0144557 | A1 | 6/2005 | Li et al. |
| 2005/0201533 | A1 | 9/2005 | Emam et al. |
| 2005/0235307 | A1 | 10/2005 | Relan et al. |
| 2005/0246666 | A1 | 11/2005 | Kalinoski et al. |
| 2005/0262542 | A1 | 11/2005 | DeWeese et al. |
| 2006/0017983 | A1 | 1/2006 | Syri et al. |
| 2006/0026302 | A1 | 2/2006 | Bennett et al. |
| 2006/0095868 | A1 | 5/2006 | Sawada et al. |
| 2006/0104293 | A1 | 5/2006 | Kopp et al. |
| 2006/0104430 | A1 | 5/2006 | Kirkland et al. |
| 2006/0104431 | A1 | 5/2006 | Emery et al. |
| 2006/0123082 | A1 | 6/2006 | Digate et al. |
| 2006/0156251 | A1 | 7/2006 | Suhail et al. |
| 2006/0168065 | A1 | 7/2006 | Martin |
| 2006/0218575 | A1 | 9/2006 | Blair |
| 2006/0250991 | A1 | 11/2006 | Jabri et al. |
| 2006/0265397 | A1 | 11/2006 | Bryan et al. |
| 2006/0265427 | A1 | 11/2006 | Cohen et al. |
| 2007/0016643 | A1 | 1/2007 | Boss et al. |
| 2007/0079010 | A1 | 4/2007 | Heredia et al. |
| 2007/0097394 | A1 | 5/2007 | Zaima et al. |
| 2007/0139513 | A1 | 6/2007 | Fang |
| 2007/0174448 | A1 | 7/2007 | Ahuja et al. |
| 2007/0198648 | A1 | 8/2007 | Allen et al. |
| 2007/0239833 | A1 | 10/2007 | Alperin et al. |
| 2007/0239880 | A1 | 10/2007 | Alperin et al. |
| 2007/0239895 | A1 | 10/2007 | Alperin et al. |
| 2008/0177616 | A1 | 7/2008 | Nemirofsky et al. |
| 2011/0167122 | A1 | 7/2011 | Groves et al. |

OTHER PUBLICATIONS

Alan Koontz, "Find In Page Script", Oct. 13, 1999, Dynamic Drive, "http://www.dynamicdrive.com/dynamicindex11/findpage.htm", all pages.*

Alan Koontz, "Find In Page Script", Oct. 13, 1999, Dynamic Drive, http://dynamicdrive.com/dynamicindex11/findpage.htm, click on "Select All" to copy and paste the actual script.*

Alan Koontz, "Find in Page Script", Jun. 2003, Dynamic Drive, all pages, http://www.dynamicdrive.com/dynamicindex11/findpage.htm.*

Brian Suda, Matt Riggott, "Enhance Usability by Highlighting Search Terms," A List Apart, all pages, http://www.alistapart.com/articles/searchhighlight.*

ChrisMcC, "Determiningif span/div is visible or not," Jun. 2004, JavaScript and AJAX Forum, all pages, http://www.webmasterworld.com/forum91/1935.htm.*

Vic Phillips, web site "http://homepage.ntlworld.com/vwphillips/SearchForText/SearchForText.htm" titled "JavaScript Code for Search for Text", Jan. 15, 2005, all pages.*

Ashok Hariharan, "DHTML Text Marker—An Experiment," Jul. 2002, evolt.org, all pages, http:evolt.org/node/29028.*

Googlebar, "Googlebar Releases," Mar. 17, 2005, http://googlebar.mozdev.org/releases.html, all pages inlcuidng Bug 8938 details.*

Surtell, "Google highlighting," Jan. 27, 2004,http://surtell.com/projects_code_google_highlighting.asp, all pages.*

U.S. Appl. No. 11/255,089, filed Oct. 19, 2005, Jordan Alperin et al.
U.S. Appl. No. 11/266,011, filed Nov. 2, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399,097, filed Apr. 5, 2006, Jordan Alperin et al.
U.S. Appl. No. 11/399,098, filed Apr. 5, 2006, Jordan Alperin et al.
U.S. Appl. No. 11/399,584, filed Apr. 5, 2006, Jordan Alperin.
U.S. Appl. No. 11/400,643, filed Apr. 6, 2006, Jordan Alperin et al.
U.S. Appl. No. 11/400,616, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.
U.S. Appl. No. 11/293,028, Office Action dated Nov. 14, 2007, 11 pg.

U.S. Appl. No. 11/293,028, Final Office Action dated Mar. 17, 2008, 11 pgs.
U.S. Appl. No. 11/293,028, Office Action dated Aug. 13, 2008, 9 pgs.
U.S. Appl. No. 11/293,028, Final Office Action dated Apr. 15, 2009, 12 pgs.
U.S. Appl. No. 11/293,028, Advisory Action dated Jul. 6, 2009, 3 pgs.
U.S. Appl. No. 11/399,096, Office Action dated Jan. 22, 2009, 14 pgs.
U.S. Appl. No. 11/399,096, Final Office Action dated Jun. 17, 2009, 11 pgs.
U.S. Appl. No. 11/399,585, Office Action dated Mar. 24, 2009, 17 pgs.
U.S. Appl. No. 11/266,011, Office Action dated Dec. 22, 2008, 16 pgs.
U.S. Appl. No. 11/266,011, Office Action dated Jun. 10, 2009, 14 pgs.
U.S. Appl. No. 11/399,098, Office Action dated Aug. 25, 2008, 16 pgs.
U.S. Appl. No. 11/399,098, Terminal Disclaimer dated Nov. 25, 2008, 1 pg.
U.S. Appl. No. 11/399,098, Requirement for Election/Restriction dated Feb. 25, 2009, 9 pgs.
U.S. Appl. No. 11/399,098, Notice of Allowance dated Jun. 2, 2009, 6 pgs.
U.S. Appl. No. 11/255,089, Office Action dated Oct. 8, 2008, 18pgs.
U.S. Appl. No. 11/255,089, Office Action dated Mar. 10, 2009, 17 pgs.
U.S. Appl. No. 11/255,089, Final Office Action dated Sep. 24, 2009, 17 pgs.
U.S. Appl. No. 11/400,643, Office Action dated Jan. 9, 2009, 18 pgs.
U.S. Appl. No. 11/400,643, Office Action dated Jul. 27, 2009, 17 pgs.
U.S. Appl. No. 11/400,616, Office Action dated Jul. 13, 2009, 21 pgs.
U.S. Appl. No. 11/400,644, Office Action dated Jan. 21, 2009, 16 pgs.
Good Technology, Inc., "Goodlink Enterprise Edition 4.5", Published in: US, Product Brochure, 4 pages.
U.S. Appl. No. 11/255,089, Appeal Brief dated Apr. 26. 2010, 17 pages.
U.S. Appl. No. 11/255,089, Advisory Action dated Dec. 15, 2009, 3 pages.
U.S. Appl. No. 11/266,011, Office Action dated Aug. 19, 2010, 19 pages.
U.S. Appl. No. 11/266,011, Advisory Action dated Apr. 23, 2010, 2 pages.
U.S. Appl. No. 11/266,011, Final Office Action dated Jan. 28, 2010, 11 pages.
U.S. Appl. No. 11/292,801, Office Action dated Mar. 3, 2009, 9 pages.
U.S. Appl. No. 11/293,028, Advisory Action dated May 23, 2008., 3 pages.
U.S. Appl. No. 11/293,028, Notice of Allowance dated Oct. 30, 2009, 16 pages.
U.S. Appl. No. 11/399,096, Office Action dated Dec. 7, 2009 , 10 pages.
U.S. Appl. No. 11/399,096, Final Office Action dated May 24, 2010, 12 pages.
U.S. Appl. No. 11/399,098, Office Action dated Aug. 25, 2008, 13 pages.
U.S. Appl. No. 11/399,098, Requirement for Election/Restriction dated Feb. 25, 2009, 6 pages.
U.S. Appl. No. 11/399,098, Response to Requirement for Election/Restriction dated Mar. 11, 2009, 10 pages.
U.S. Appl. No. 11/399,098,, filed Apr. 5, 2006, now US Patent No. 7,596,369, 16 pages.
U.S. Appl. No. 11/399,585, Advisory Action dated Jan. 25, 2010, 3 pages.
U.S. Appl. No. 11/399,585, Final Office Action dated Nov. 4, 2009, 10 pages.
U.S. Appl. No. 11/399,585, Non-Final Office Action dated Sep. 21, 2010, 15 pages.
U.S. Appl. No. 11/400,616, Final Office Action dated Feb. 1, 2010, 16 pages.
U.S. Appl. No. 11/400,643, Advisory Action dated Jan. 19, 2009, 3 pages.
WWW.COMCAST.NET/STORAGE, "Comcast on Line Storage", 2005, Published in: US, Internet Website, 1 page.
WWW.IBACKUP.COM, "Flexible Storage Solutions for the Internet Age", Nov. 2005, Published in: US, Internet Website, 1 page.
WWW.MYDOCSONLINE, "File and Data Storage", Nov. 2005, Published in: US, Internet Website, 2 pages.
WWW.STREAMLOAD.COM, "Streamload—Freedom for Your Digital Lifestyle", Nov. 2005, Published in: US, Internet Website, 1 page.
WWW.XDRIVE.COM, "Secure on Line Storage", Nov. 2005, Published in : US, Internet Website, 2 pages.
U.S. Appl. No. 11/399,096, Office Action dated Oct. 27, 2010, 11 pages.
U.S. Appl. No. 11/399,097, Final Office Action dated Sep. 1, 2010, 10 pages.
U.S. Appl. No. 11/399,097, Office Action dated Mar. 26, 2010, 12 pages.
U.S. Appl. No. 11/399,097, Requirement for Election/Restriction dated Jan. 26, 2010, 6 pages.
U.S. Appl. No. 11/399,097, Response to Requirement for Election/Restriction dated Feb. 22, 2010, 1 page.
U.S. Appl. No. 11/399,584, Examiner's Answer to Appeal Brief dated Jun. 22, 2009, 16 pages.
U.S. Appl. No. 11/399,584, Appeal Brief dated Mar. 12, 2009, 24 pages.
U.S. Appl. No. 11/399,584, Advisory Action dated Dec. 18, 2008, 3 pages.
U.S. Appl. No. 11/399,584, Final Office Action dated Sep. 12, 2008, 12 pages.
U.S. Appl. No. 11/399,584, Office Action dated Mar. 6, 2008, 10 pages.
U.S. Appl. No. 11/383,620, Office Action dated Nov. 9, 2010, 17 pages.
U.S. Appl. No. 11/383,620, Final Office Action dated May 14, 2010, 20 pages.
U.S. Appl. No. 11/383,620, Office Action dated Nov. 10, 2009, 15 pages.
U.S. Appl. No. 11/383,620, Office Action dated Apr. 2, 2009, 14 pages.
U.S. Appl. No. 11/399,585, Final Office Action dated Feb. 8, 2011, 23 pages.
U.S. Appl. No. 11/266,011, Final Office Action dated Feb. 4, 2011, 25 pgs.
U.S. Appl. No. 111399,096, Final Office Action dated Feb. 11, 2011, 15 pages.
U.S. Appl. No. 11/399,097, Office Action dated Jan. 11, 2011,11 pages.
U.S. Appl. No. 11/400,643, Office Action dated Oct. 14, 2010, 19 pages.
U.S. Appl. No. 11/400,643, Office Action dated Mar. 7, 2011,21 pages.
U.S. Appl. No. 11/400,616, Office Action dated Mar. 16, 2011, 16 pages.
U.S. Appl. No. 11/400,616; Non Final Office Action dated Aug. 18, 2011; 35 pages.
U.S. Appl. No. 11/400,643; Non Final Office Action dated Jul. 28, 2011; 20 pages.
U.S. Appl. No. 11/399,097; Notice of Allowance dated Jul. 29, 2011; 20 pages.
U.S. Appl. No. 11/399,097; Notice of Allowance dated Aug. 23, 2011; 5 pages.
U.S. Appl. No. 11/266,011; Notice of Allowance dated Oct. 7, 2011; 18 pages.
U.S. Appl. No. 11/399,096, Office Action dated Jul. 12, 2011; 14 pages.
U.S. Appl. No. 11/399,585,; Office Action dated Jul. 18, 2011; 20 pages.
U.S. Appl. No. 11/400,643; Notice of Panel Decision dated Jul. 11, 2011; 2 pages.
U.S. Appl. No. 11/383,620,; Non Final Office Action dated Aug. 31, 2011; 21 pages.
U.S. Appl. No. 11/383,620, Final Office Action dated Mar. 28, 2011, 27 pages.
U.S. Appl. No. 11/399,096, Notice of Panel Decision from Pre-Appeal Brief Review dated May 20, 2011, 2 pages.

U.S. Appl. No. 11/400,643, Pre-Appeal Brief and Notice of Appeal dated Jun. 7, 2011, 6 pages.
U.S. Appl. No. 11/399,096; Final Office Action dated Dec. 6, 2011; 15 pages.
U.S. Appl. No. 11/399,585; Non Final Office Action dated Jan. 4, 2012; 19 pages.
U.S. Appl. No. 11/400,643 Notice of Allowance Dec. 27, 2011; 26 pages.
U.S. Appl. No. 11/399,097; Supplemental Notice of Allowability dated Oct. 31, 2011: 5 pages.
U.S. Appl. No. 11/399,097; Issue Notification dated Nov. 22, 2011; 1 page.

* cited by examiner

WEBPAGE SEARCH

BACKGROUND OF THE INVENTION

Embodiments of the present invention relate generally to the field of information searches and more particularly to searches of the contents of a webpage, where the search feature is provided as part of the webpage.

Webpages can be very short containing little textual information or may include mostly graphics with little other information. In other cases, a webpage can be very long and contain a large amount of textual information. In such cases, locating a specific word or phrase of interest to a user can be difficult. For example, a search using a common or popular search engine may discover a page with hundreds or thousands or more words with only a few, but relevant, occurrences of the user's search term. For the user to determine how relevant this information is to him, he may need to read or scan a significant portion of the document to determine how or why the search engine detected this page. For very long pages, trying to locate information in this way can be very time consuming. In some cases, the user may not even find the relevant information before giving up.

Many, although not all, web browsers today have a built-in search feature that allows a user to search for text occurring on a currently viewed webpage. For example, Microsoft Internet Explorer provides a "Find (on This Page)" function available under the "Edit" selection of the top menu bar. With this function a user can enter a string for which the browser will search. The browser then jumps or scrolls the page directly to the first occurrence of text that matches the search string. Subsequent occurrences of the string can be found by selecting a "Find Next" button which causes the page to scroll to display the subsequent occurrences.

However, not all browsers offer such a function. Furthermore, these browser-based searches are rather limited in their functionality. They allow a user to search for occurrences of a particular sting and may allow a user to select searching forward or backward but no other functionality is provided. No further functionality is provided. For example, available browser based searches are limited to searching the visible portions of a webpage and cannot search a header, footer, or metadata of a webpage and are limited to searching the entire, visible contents of the page. That is, they do not allow the developer or user of the browser to specify portions of the page to be searched and cannot search portions of the webpage that are not being displayed. Finally, the functionality of a browser-based search is strictly limited to that supplied by the code of the browser. The developer of the webpage has no control over this functionality and cannot expand or modify this functionality to suit the content of his webpage or service.

Hence, there is a need for methods and systems that allow for searching the contents of a webpage regardless of the browser used to view the page.

BRIEF SUMMARY OF THE INVENTION

Systems, methods, and machine-readable media are disclosed to provide a search of contents of a webpage, where the search feature is provided as part of the webpage. In one embodiment, a method of providing such an in-page search of contents of a webpage can comprise reading a user's search criteria through an element of the webpage. The contents of the webpage can be searched to identify text matching the search criteria. Formatting instructions can be inserted into the webpage to change the appearance of the identified text relative to other text on the webpage. The webpage can be redisplayed with the inserted formatting instructions.

According to one embodiment, inserting formatting instructions into the webpage can further comprise removing the identified text from the webpage, adding formatting instructions in front of and behind the removed text, and reinserting the identified text and added formatting instruction into the webpage at an original location of the identified text. The formatting instructions can comprise HyperText Markup Language (HTML) tags. In some cases, the method can further comprise determining whether the identified text is visible to a user of the webpage. In such a case, inserting formatting instructions into the webpage around the identified text can comprise inserting formatting instructions into the webpage around visible identified text.

According to another embodiment, the element of the webpage for reading a user's search criteria can comprise a search box. The search box can include a text box for accepting user input of the search criteria and/or one or more elements for controlling the search. In some cases, the search box can be made visible on the webpage in response to a first user input and can be made invisible on the webpage in response to a second user input.

According to yet another embodiment, a system for providing a webpage including an in-page search function can comprise a processor and a memory coupled with and readable by the processor. The memory can contain instructions which, when executed by the processor, cause the processor to read a user's search criteria through an element of the webpage, search contents of the webpage to identify text matching the search criteria, insert formatting instructions into the webpage to change the appearance of the identified text relative to other text on the webpage, and redisplay the webpage with the inserted formatting instructions.

According to still another embodiment, a machine-readable media can have stored thereon a series of instructions. The instructions, when executed by a processor, can cause the processor to provide a webpage including an in-page search function by reading a user's search criteria through an element of the webpage, searching the contents of the webpage to identify text matching the search criteria, inserting formatting instructions into the webpage to change the appearance of the identified text relative to other text on the webpage, and redisplaying the webpage with the inserted formatting instructions.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, systems and machine-readable media for providing a search of contents of a webpage, where the search feature is provided as part of the webpage and therefore, not dependent upon the functionality of the browser used to view the page. As will be described in detail below, an in-page search of contents of a webpage can comprise reading a user's search criteria through an element of the webpage. The contents of the webpage can be searched to identify text matching the search criteria. Formatting instructions can be inserted into the webpage to change the appearance of the identified text relative to other text on the webpage. The webpage can be redisplayed with the inserted formatting instructions.

Figure 1:
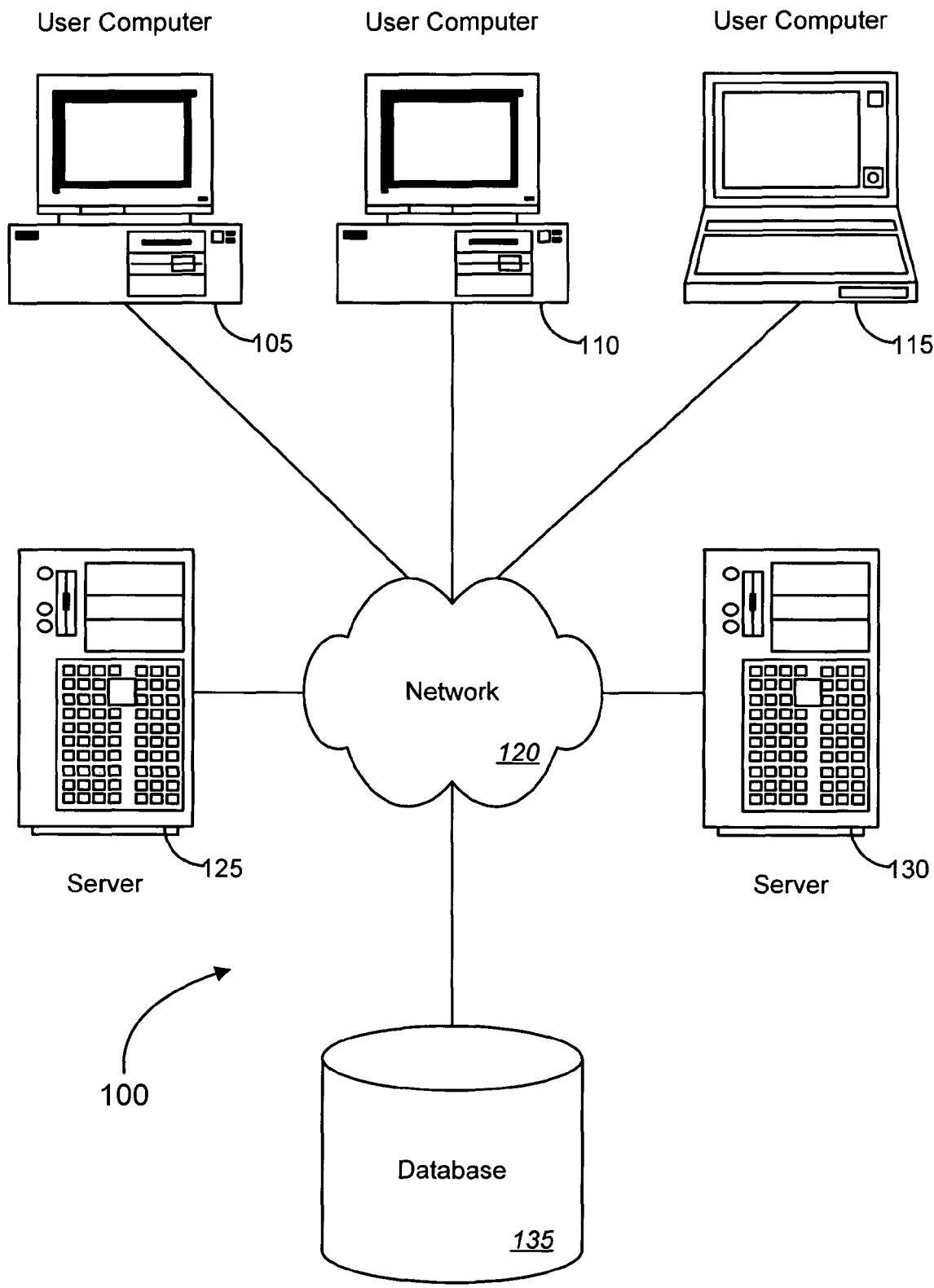
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 includes one or more user computers 105, 110, and 115. The user computers 105, 110, and 115 may be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems. These user computers 105, 110, 115 may also have any of a variety of applications, including for example, database client and/or server applications, and web browser applications. Alternatively, the user computers 105, 110, and 115 may be any other electronic device, such as a thin-client computer, Internet-enabled mobile telephone, and/or personal digital assistant, capable of communicating via a network (e.g., the network 120 described below) and/or displaying and navigating webpages or other types of electronic documents. Although the exemplary system 100 is shown with three user computers, any number of user computers may be supported.

System 100 further includes a network 120. The network 120 may can be any type of network familiar to those skilled in the art that can support data communications using any of a variety of commercially-available protocols, including without limitation TCP/IP, SNA, IPX, AppleTalk, and the like. Merely by way of example, the network 120 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 125, 130. One server may be a web server 125, which may be used to process requests for webpages or other electronic documents from user computers 105, 110, and 120. The web server can be running an operating system including any of those discussed above, as well as any commercially-available server operating systems. The web server 125 can also run a variety of server applications, including HTTP servers, FTP servers, CGI servers, database servers, Java servers, and the like. In some instances, the web server 125 may publish available operations as one or more web services.

The system 100 may also include one or more file and/or application servers 130, which can, in addition to an operating system, include one or more applications accessible by a client running on one or more of the user computers 105, 110, 115. The server(s) 130 may be one or more general purpose computers capable of executing programs or scripts in response to the user computers 105, 110 and 115. As one example, the server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The application server(s) 130 may also include database servers, including without limitation those commercially available from Oracle, Microsoft, Sybase™, IBM™ and the like, which can process requests from database clients running on a user computer 105.

In some embodiments, an application server 130 may create webpages dynamically. The webpages created by the web application server 130 may be forwarded to a user computer 105 via a web server 125. Similarly, the web server 125 may be able to receive webpage requests, web services invocations, and/or input data from a user computer 105 and can forward the webpage requests and/or input data to the web application server 130.

In further embodiments, the server 130 may function as a file server. Although for ease of description, FIG. 1 illustrates a separate web server 125 and file/application server 130, those skilled in the art will recognize that the functions described with respect to servers 125, 130 may be performed by a single server and/or a plurality of specialized servers, depending on implementation-specific needs and parameters.

The system 100 may also include a database 135. The database 135 may reside in a variety of locations. By way of example, database 135 may reside on a storage medium local to (and/or resident in) one or more of the computers 105, 110, 115, 125, 130. Alternatively, it may be remote from any or all of the computers 105, 110, 115, 125, 130, and in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database that is adapted to store, update, and retrieve data in response to SQL-formatted commands.

Figure 2:
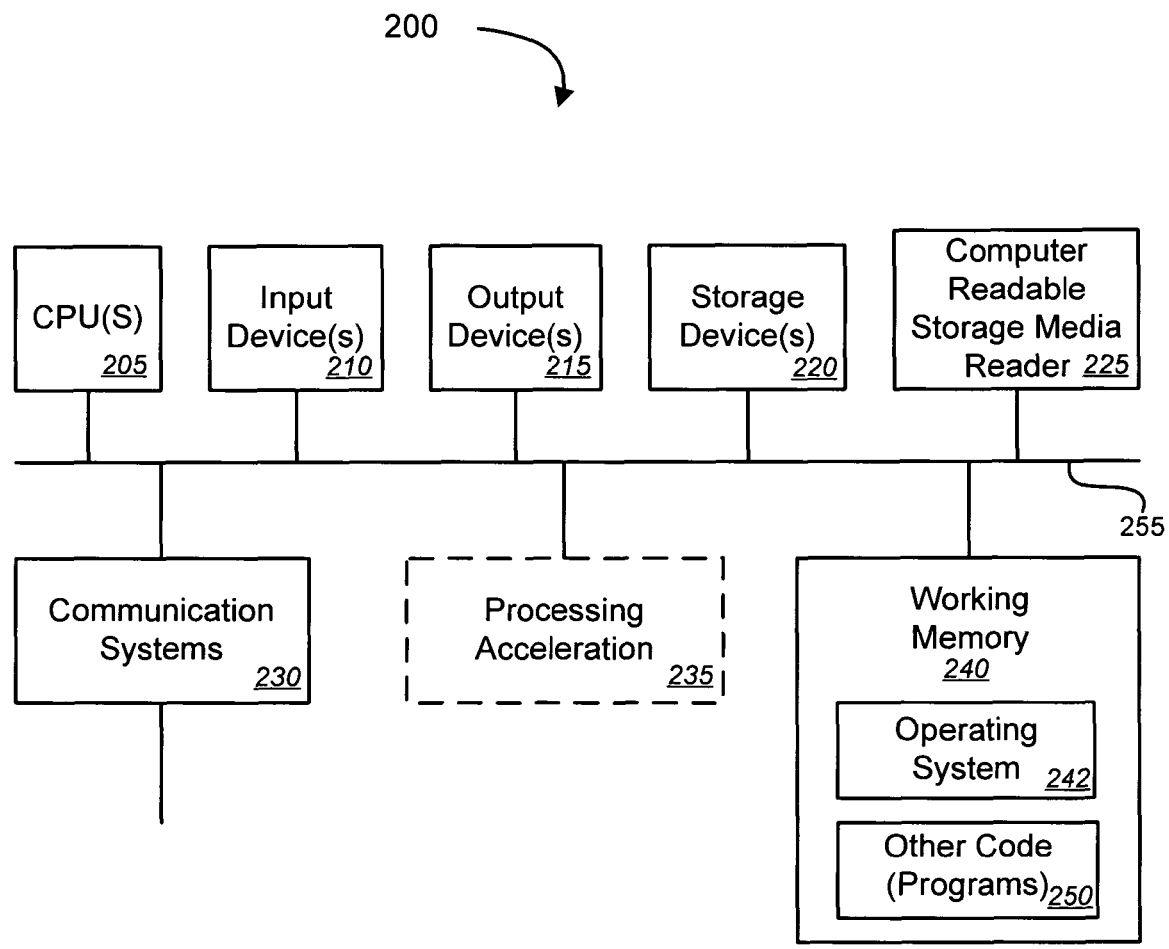
FIG. 2 is a block diagram illustrating an exemplary computer system in which embodiments of the present invention may be implemented.

FIG. 2 is a block diagram illustrating an exemplary computer system in which embodiments of the present invention may be implemented. This example illustrates a computer system 200 such as may be used, in whole, in part, or with various modifications, to provide a server or a client such as those discussed above.

The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage devices 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device (s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Software of computer system 200 may include code 250 for implementing any or all of the function of a webpage search as described herein. For example, software, stored on and/or executed by a computer system such as system 200, can provide or serve a webpage containing an in-page search. In other cases, a system such as system 200 may act as a client, providing or displaying to a user via a web browser a webpage including an in-page search.

Generally speaking, a method of providing a webpage search, according to one embodiment of the present invention, can comprise reading a user's search criteria through an element of the webpage. The contents of the webpage can be searched to identify text matching the search criteria. Formatting instructions can be inserted into the webpage to change the appearance of the identified text relative to other text on the webpage. The webpage can be redisplayed with the inserted formatting instructions. As will be discussed in detail below, these functions can be performed by software, such as Java applets, Java Script, VB Script, Active X controls, or other types of code, included in the webpage.

Figure 3:
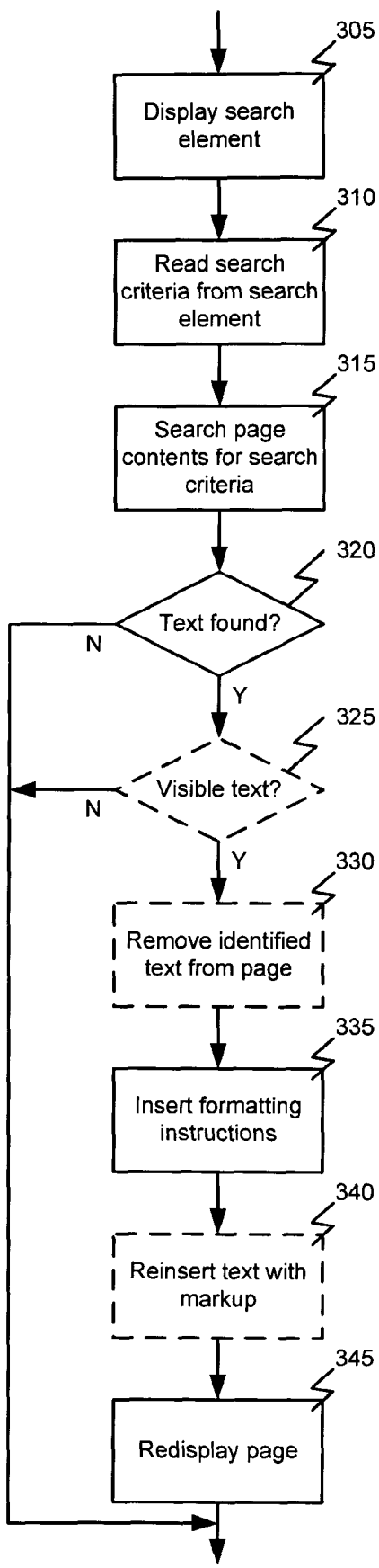
FIG. 3 is a flowchart illustrating a process for providing an in-page search according to one embodiment of the present invention.

FIG. 3 is a flowchart illustrating a process for providing an in-page search according to one embodiment of the present invention. In this example, the process begins by displaying 305 a search element to a user or viewer of the webpage. The search element can be any of a variety of possible elements such as an overlay box, popup window, drop down menu, or other type of webpage element, but can be provided as part of the webpage. That is, code for providing the search element and performing the search functions can be included, for example, as HyperText Markup Language (HTML) and/or Java Script or other scripting language. For example, the contents, i.e., text, graphics, sound, etc. of a webpage is typically formatted and presented in HTML or other markup language. The search element may also be formatted and presented using a markup language while the functions of search itself may be performed by code included in the webpage for performing a client-side process such as a Java applet Java Script, VB Script, Active X control etc. or by code for initiating a server-side process such as implemented by CGI or other process However implemented, the search element can provide a means for the user of the webpage to enter a string or other search criteria and can also provide controls for performing the search. Exemplary search elements will be described below with reference to FIGS. 4 and 5.

Regardless of the exact type or format of the search element, a user's search criteria can be read 310 through the search element of the webpage and the contents of the webpage can be searched 315 to identify text matching the search criteria. That is, the contents of the webpage can be searched, for example by a script language or client-side program associated with the search element as discussed above, for text matching the string or other search criteria entered through the search element by the user.

A determination 320 can be made as to whether text matching the search criteria has been found in the content of the webpage. Optionally, an additional determination 325 can be made as to whether the text found 320 is visible text within the webpage. That is, in some cases, the header, footer, metadata and other portions of the page not typically visible to the user can be searched as well as or instead of the visible portions of the page. If the entire content of the webpage is searched, matching text may be found in the header, metadata, or other portion of the webpage not typically displayed to the user of the webpage. Such text may not be relevant to the user and therefore may be excluded from the search results. In other cases, matching text found in the header, footer, metadata or other portion of the webpage not visible to the user can be made visible, i.e., can be edited and displayed to the user, in any of a variety of ways. For example, a list of matching metadata can be displayed in the webpage, in a pop-up window, or in another manner.

If 320 matching text is found and the text is visible 325, if such a check is made, the matching text can be modified to highlight it or otherwise make it easily visible or recognizable to the user. Generally speaking, this can be accomplished by inserting 335 formatting instructions such as HyperText Markup Language (HTML) tags into the webpage, such as around the identified text, to change the appearance of the identified text relative to other text on the webpage. In other cases, other types of formatting instructions can be added to or modified in the webpage. For example, properties of a Cascading Style Sheet (CSS) can be added or modified to change the appearance of the matching text relative to the rest of the web page.

Optionally, modifying the text can comprise removing 330 the identified text from the webpage prior to adding formatting instructions in front of and behind the removed text 335, and reinserting 335 the identified text and added formatting instruction into the webpage at an original location of the identified text. Alternatively or additionally, other changes can be made to the webpage. That is, rather than inserting formatting instructions before and/or after the matching text, formatting instructions can be inserted into the webpage to provide a list or summary of matching text at the top of the webpage. Other possibilities for formatting matching text will be discussed below. Either way, formatting instructions can be added to the content of the webpage, for example by a scripting language such as Java Script, VB script, etc., by a client side program coded in Java, Active X, etc. or by a server-side process such as implemented by CGI or other process and the webpage can be redisplayed 345 with the inserted formatting instructions.

Exactly how the matching text is formatted can vary widely depending upon the implementation. Some examples of formatting for the matching text can include but are not limited to changing the font, font color, or font size, changing the typeface to bold, underline, italics, etc., adding highlighting or shading around or behind the text, making the text blink, making the text a link anchor so that a user can jump or hyperlink to a next, previous, first, or last occurrence in a long document, etc. In other cases, the matching text can be moved or copied and presented in a list, summary, or other format in the webpage or elsewhere. Generally speaking, any text effect provided by HTML or other markup language used to provide the webpage or other information used to control the appearance of the webpage such as a CSS can be used to change the appearance of the matching text. Additional examples of formatting the matching text will be discussed below.

Figure 4:
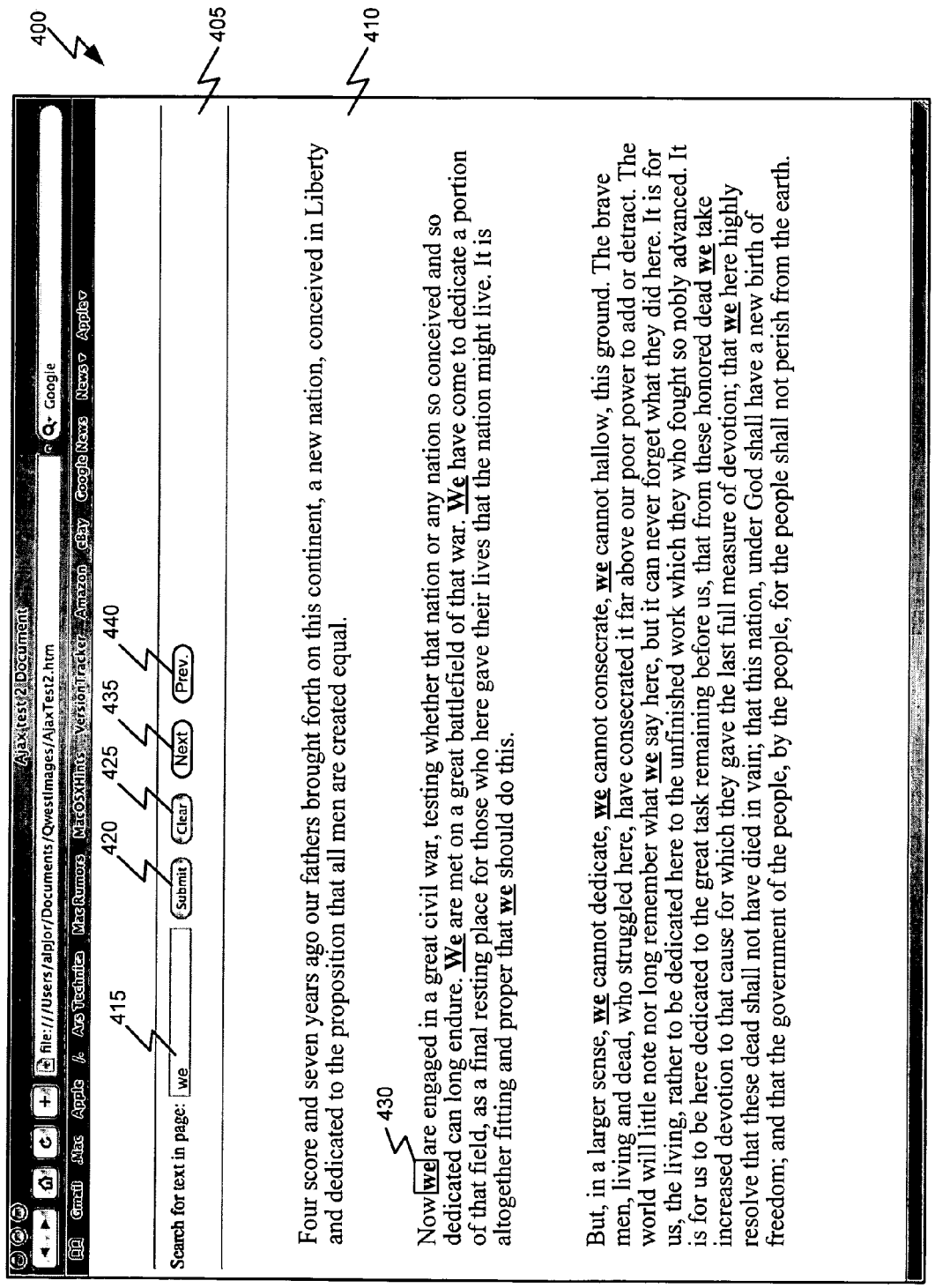
FIG. 4 illustrates a webpage with a search element for providing an in-page search according to one embodiment of the present invention.

FIG. 4 illustrates an exemplary webpage with an in-page search according to one embodiment of the present invention. In this example, a webpage 410 is shown displayed in a browser window 400. As should be apparent from the discussion thus far, the exact browser used is largely irrelevant since the various embodiments of the present invention provide a search feature that is part of, i.e., built into, the webpage itself using languages that can be rendered or executed by any browser, including but not limited to HTML, Java, Java Script, VB Script, Active X etc.

In this example, the webpage includes a search element 405 represented by a box at the top of the page 410. It should be understood that the layout and format of the search element 405 and the webpage 410 can vary widely without departing from the scope of the present invention. For example, rather than the search box 405 as shown here, a banner, frame, or other graphical device can be place anywhere on the page. Furthermore, as will be discussed, the contents of the search element can vary.

As shown here, the search element 405 includes a text box 415 for accepting user input of the search criteria. That is, the text box 415 can provide a means through which the user can enter a string or other search criteria. In the example shown here, the word "we" has been entered as the search criteria.

Also in the search element 415 is a number of controls 420-440 in the form of buttons for controlling the search. These controls 420-440 include a submit button 420 for initiating the search after a search criteria has been entered in text box 415 and a clear button 425 for clearing the search criteria from the text box 415. Also included in this example are a next button 435 and a previous button 440 that can be used for navigating through the search results. For example, when used to search very large webpages, especially a page that scrolls far beyond the bottom of the browser window, it may be convenient for the user to be able to jump from one match to the next, or previous match. Therefore, the matching text can be marked with a link anchor tag and the search function can maintain a list of the list anchors allowing the search function to jump from one to the next or previous match via the buttons.

The search results are shown within the text of the webpage. Here the matching text is shown in bold and underlined. Additionally, the first occurrence 430 of matching text is shown in a box which may or may not be highlighted or colored. Such a box or highlighting may be useful for navigating results using the next and previous buttons 435 and 440 In other cases, all matching text may be similarly highlighted.

It should be understood that additional variations are contemplated and considered to be within the scope of the present invention. For example, while not shown here, different or additional types of controls may be used in the search element. For example, a set of check boxes, radio buttons, or a menu may be provided for allowing the user to select how he wants the results to be shown. For example, a set of radio buttons may be included through which the user can select whether he wants the results shown in bold, in a particular color, highlighted, etc. In another example, a drop down menu may be provided to allow the user to select colors for matching text and/or background highlighting, the default direction of navigation or even to configure how the search element appears and what controls are found therein. Additionally, the appearance and location of the search element 405 can vary widely. For example, the search element 405 can comprise a frame at the top, bottom, left, or right edge of the browser window 400. Another alternative will now be discussed.

Figure 5:
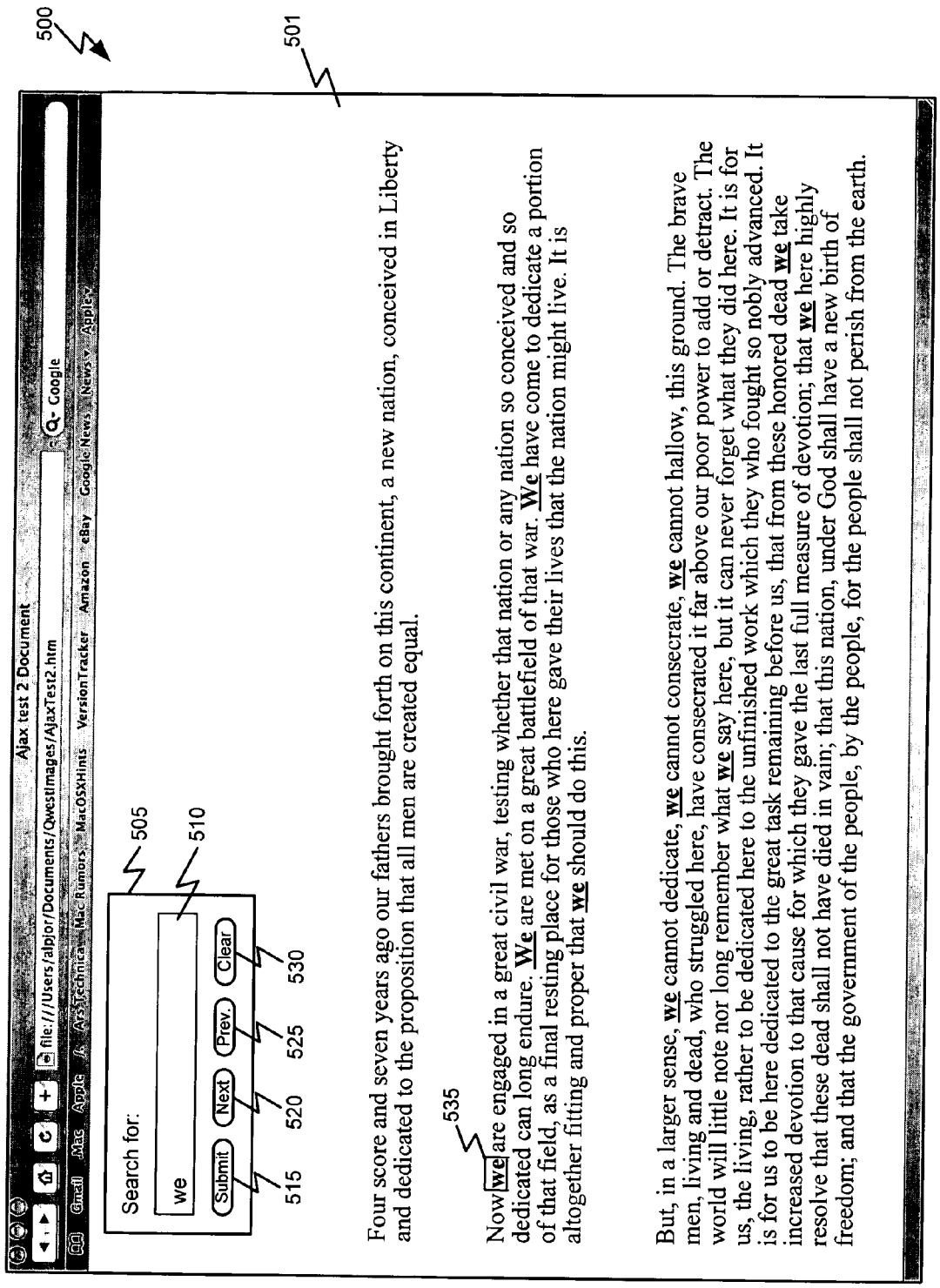
FIG. 5 illustrates a webpage with a search element for providing an in-page search according to an alternative embodiment of the present invention.

FIG. 5 illustrates an exemplary webpage with an in-page search according to an alternative embodiment of the present invention. In this example, a webpage 501 is shown displayed in a browser window 500. The search element 505 of the webpage in this case comprises a search box in the form of an overlay, popup window, or similar feature. The search box 505 includes a text box 510 for accepting user input of the search criteria. The search box 505 includes a number of elements in the form of buttons 515-530 for controlling the search. In this example the controls include a submit button 515 for initiating the search after a search criteria has been entered in text box 510 and a clear button 530 for clearing the search criteria from the text box 510. Also included in this example are a next button 520 and a previous button 525 that can be used for navigating through the search results. Other controls that may be used include, but are not limited to, a first button for jumping to the first occurrence of matching text and a last button for jumping to the last occurrence of matching text.

In this example, for the sake of clarity, the search box 505 is shown in a blank portion of the webpage 501. However, the search box 505 need not be static and may be displayed in any potion of the webpage 501. For example, the search box 505 may be implemented as an overlay, popup window, or other similar graphic. In such a case, the search box 505 may, by default be invisible. Then, for example, the search box 505 can become visible on the webpage 501 in response to a first user input such as a user moving the cursor over a specified spot on the webpage 501, clicking a link, pressing a key or combination of keys on the keyboard, etc. Furthermore, the search box 505 can become invisible on the webpage 501 in response to a second user input such as clicking a close button, moving the cursor away from the search box 505, pressing a key or combination of keys on the keyboard, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing an in-page search of contents of a webpage, the method comprising:
displaying, with a web browser, a visible portion of a webpage, the webpage comprising:
markup text comprising text and formatting tags that format the text according to a markup language;
executable code that performs an in-page search of contents of the webpage, the executable code being independent of search functionality of the web browser and included in the markup text; and
an element that receives a user's search criteria;
reading the user's search criteria with the executable code;
searching contents of the webpage with the executable code to identify text matching the search criteria;
providing on the webpage, with the executable code, a set of user interface controls for the user to select text formatting options for text identified as matching the search criteria;
modifying, with the executable code, a set of markup tags corresponding to the identified text in accordance with the text formatting options selected by the user, based on a determination that the identified text matches the search criteria, to change the appearance of the identified text relative to other text on the webpage, wherein the modified set of markup tags make the identified text a hyperlink allowing the user to jump to a next match on the webpage, wherein modifying the set of markup tags corresponding to the identified text comprises:
removing the identified text from the webpage using the executable code;
adding formatting instructions in front of and behind the removed identified text using the executable code; and
reinserting the removed identified text and the added formatting instructions into the webpage at an original location of the removed identified text; and
redisplaying, with the executable code, the visible portion of the webpage with the modified set of markup tags.

2. The method of claim 1, wherein the markup language comprises HyperText Markup Language (HTML) tags.

3. The method of claim 1, further comprising determining with the executable code whether the identified text is visible to a user of the webpage.

4. The method of claim 3, wherein modifying a set of markup tags comprises modifying a set of markup tags corresponding to visible identified text.

5. The method of claim 1, wherein the element of the webpage comprises a search box.

6. The method of claim 5, wherein the search box includes a text box for accepting user input of the search criteria.

7. The method of claim 5, wherein the search box includes one or more elements for controlling the search.

8. The method of claim 5, further comprising causing the search box to become visible on the webpage in response to a first user input.

9. The method of claim 8, further comprising causing the search box to become invisible on the webpage in response to a second user input.

10. A system for providing a webpage including an in-page search function, the system comprising:
a processor; and
a memory coupled with and readable by the processor, the memory containing instructions which, when executed by the processor, cause the processor to:
display, with a web browser, a visible portion of a webpage, the webpage comprising:
markup text comprising text and formatting tags that format the text according to a markup language;
executable code that performs an in-page search of contents of the webpage, the executable code being independent of search functionality of the web browser and included in the markup text; and
an element that receives a user's search criteria;
read the user's search criteria with the executable code;
search contents of the webpage with the executable code to identify text matching the search criteria;
provide on the webpage, with the executable code, a set of user interface controls for the user to select text formatting options for text identified as matching the search criteria;
modify, with the executable code, a set of markup tags corresponding to the identified text in accordance with the text formatting options selected by the user, based on a determination that the identified text matches the search criteria, to change the appearance of the identified text relative to other text on the webpage, wherein the modified set of markup tags make the identified text a hyperlink allowing the user to jump to a next match on the webpage, wherein modifying the set of markup tags corresponding to the identified text comprises:
removing the identified text from the webpage using the executable code;
adding formatting instructions in front of and behind the removed identified text using the executable code; and
reinserting the removed identified text and the added formatting instructions into the webpage at an original location of the removed identified text; and
redisplay, with the executable code, the visible portion of the webpage with the set of modified markup tags.

11. The system of claim 10, wherein the markup language comprises HyperText Markup Language (HTML) tags.

12. The system of claim 10, wherein the instructions further cause the processor to determine, with the executable code, whether the identified text is visible to a user of the webpage.

13. The system of claim 12, wherein modifying a set of markup tags comprises modifying a set of markup text corresponding to visible identified text.

14. The system of claim 10, wherein the element of the webpage comprises a search box.

15. The system of claim 14, wherein the search box includes a text box for accepting user input of the search criteria.

16. The system of claim 14, wherein the search box includes one or more elements for controlling the search.

17. The system of claim 14, wherein the instructions further cause the processor to cause the search box to become visible on the webpage in response to a first user input.

18. The system of claim 17, wherein the instructions further cause the processor to cause the search box to become invisible on the webpage in response to a second user input.

19. A non-transitory machine-readable media having stored thereon a series of instructions which, when executed by a processor, cause the processor to provide a webpage including an in-page search function by:

displaying, with a web browser, a visible portion of a webpage, the webpage comprising:
  markup text comprising text and formatting tags that format the text according to a markup language;
  executable code that performs an in-page search of contents of the webpage, the executable code being independent of search functionality of the web browser and included in the markup text; and
  an element that receives a user's search criteria;
reading the user's search criteria with the executable code;
searching contents of the webpage with the executable code to identify text matching the search criteria;
providing on the webpage, with the executable code, a set of user interface controls for the user to select text formatting options for text identified as matching the search criteria;
modifying, with the execution code, a set of markup tags corresponding to the identified text in accordance with the text formatting options selected by the user, based on a determination that the identified text matches the search criteria, to change the appearance of the identified text relative to other text on the webpage, wherein the modified set of markup tags make the identified text a hyperlink allowing the user to jump to a next match on the webpage, wherein modifying the set of markup tags corresponding to the identified text comprises:
  removing the identified text from the webpage using the executable code;
  adding formatting instructions in front of and behind the removed identified text using the executable code; and
  reinserting the removed identified text and the added formatting instructions into the webpage at an original location of the removed identified text; and
  redisplaying, with the executable code, the visible portion of the webpage with the set of modified markup tags.

20. The machine-readable media of claim 19, wherein the markup language comprises HyperText Markup Language (HTML) tags.

21. The machine-readable media of claim 19, further comprising determining with the executable code whether the identified text is visible to a user of the webpage.

22. The machine-readable media of claim 21, wherein modifying a set of markup tags comprises modifying a set of markup tags corresponding to visible identified text.

23. The machine-readable media of claim 19, wherein the element of the webpage comprises a search box.

24. The machine-readable media of claim 23, wherein the search box includes a text box for accepting user input of the search criteria.

25. The machine-readable media of claim 23, wherein the search box includes one or more elements for controlling the search.

26. The machine-readable media of claim 23, further comprising causing the search box to become visible on the webpage in response to a first user input.

27. The machine-readable media of claim 26, further comprising causing the search box to become invisible on the webpage in response to a second user input.

28. The method of claim 1, wherein modifying a set of markup tags corresponding to the identified text further comprises modifying a cascading style sheet corresponding to the identified text.

29. The method of claim 1, further comprising:
  moving or copying the identified text on the webpage.

30. The method of claim 1, further comprising:
  presenting, on the webpage, a summary of the identified text.

* * * * *